United States Patent [19]

Lauber

[11] 4,266,627
[45] May 12, 1981

[54] TRAVELING ASSEMBLY AND WHEEL SUSPENSION FOR A ROLLING AND STEPPING VEHICLE

[75] Inventor: Ernst Lauber, Thun, Switzerland

[73] Assignee: Willy Habegger, Thun, Switzerland

[21] Appl. No.: 14,687

[22] Filed: Feb. 23, 1979

[30] Foreign Application Priority Data

Feb. 22, 1978 [DE] Fed. Rep. of Germany ....... 2807517

[51] Int. Cl.³ .............................................. B62D 57/02
[52] U.S. Cl. .................................................... 180/8 B
[58] Field of Search .................... 180/8 B, 8 BA, 8 R, 180/8 C, 8 D; 280/43.23, 43.24; 305/1

[56] References Cited

U.S. PATENT DOCUMENTS

1,539,787  5/1925  Susio ................................. 180/8 BA

FOREIGN PATENT DOCUMENTS

798130  3/1936  France ..................................... 180/8 B

*Primary Examiner*—John A. Pekar
*Attorney, Agent, or Firm*—Karl F. Ross

[57] ABSTRACT

A traveling assembly, especially a wheel suspension, for a vehicle capable of rolling and stepping or walking travel upon a regular or uneven surface, e.g. for cranes, excavators, construction, earth-moving, mining and other machinery in which wheels are articulated at the ends of legs which, in turn, are pivotally connected to a support structure. The legs themselves are formed with telescoping support elements which can be extended and retracted while a fluid-pressure cylinder can be provided to pivot the arm which is articulated to the lower end of the leg and which carries the wheel.

10 Claims, 5 Drawing Figures

TRAVELING ASSEMBLY AND WHEEL SUSPENSION FOR A ROLLING AND STEPPING VEHICLE

CROSS REFERENCE TO RELATED APPLICATIONS

This application is related to my commonly assigned, concurrently filed, copending applications Ser. No. 014,594 and Ser. No. 014,593.

FIELD OF THE INVENTION

My present invention relates to a traveling assembly or wheel suspension for a vehicle and, more particularly, for a vehicle capable of rolling or striding movement over even or uneven surfaces, especially for industrial and construction vehicles which may be used as cranes, excavators, bulk transporters or the like.

The present invention, in particular, deals with a wheel suspension assembly or, more generally, a rolling or walking support for a vehicle of the type described in the aforementioned copending application Ser. No. 014,593, the contents of which are hereby incorporated entirely and by reference.

BACKGROUND OF THE INVENTION

It is known to provide cranes, excavators and the like with a chassis or support which can have a plurality of wheels, some of which may be driven, and outriggers with telescoping extensible members terminating in ground-engaging pads or feet, which can support the vehicle for various operations. In such systems, once the vehicle is in place for a particular task, the outriggers can be extended to lift the vehicle and raise the wheels from the ground, thereby increasing the stability of the chassis for any particular excavating or loading operation.

Such systems are used on backhoes, extensible-boom cranes and the like.

The outriggers are, of course, mounted separately from the wheels to enable them to be shifted, e.g. by hand, into any particular location for supporting the chassis with respect to the site at which work is to be performed. The wheels are usually mounted in their customary pattern for vehicles, at the four corners of a vehicle frame or chassis.

Since the telescoping members on one side or end of the vehicle can be extended to a greater or lesser degree than those on the opposite side or end of the vehicle, the vehicle can be supported horizontally on irregular, uneven, stepped or sloping surfaces.

Naturally, such systems cannot be used effectively for combined rolling and walking or climbing action, inasmuch as the outriggers are independent of the wheels and vice versa.

Climbing vehicles are also known but here too climbing and rolling action simultaneously cannot usually be effected and frequently it is necessary to use crawler principles for vehicles which are intended to be brought into play on irregular surfaces.

OBJECTS OF THE INVENTION

It is the principal object of the present invention to provide an improved wheel suspension for industrial, agricultural, earth-moving, mining or construction vehicles which markedly increases the versatility thereof.

It is another object of the present invention to provide an improved wheel support for a rolling and stopping or walking vehicle which allows a combination of both types of displacement to be carried out effectively.

Yet another object of the invention is to provide an improved wheel mounting assembly or traveling system for a vehicle such as a crane or excavator which is capable of being transformed from a portal or gantry (raised body) configuration to a compact (lowered body) configuration.

A further object of the present invention is to provide a wheel assembly which will enable such a vehicle to be used with excellent purchase upon inclined, steeped, contoured or other irregular terrains as may be encountered with banks, hills, mountains and mining sites.

In conjunction with the last-mentioned object, it is also an object of the invention to provide wheel assembly which facilitates traveling of the vehicle upon and along such irregular terrains.

SUMMARY OF THE INVENTION

These objects and others which will become apparent hereafter are attained in accordance with the present invention in the vehicle of the type described and especially of the type illustrated and fully disclosed in my copending application Ser. No. 014,593, which comprises a leg pivotally connected to the vehicle chassis or support and formed with an element telescopingly received in this leg and, provided at its end with a ground-engaging pad or foot. According to the invention, this telescoping leg structure is provided with a wheel which is journaled at the end of a lever or arm which, in turn, is articulated to the lower end of the leg, preferably along an inner side of the leg with respect to the vehicle structure (i.e. a side turned toward the center of the vehicle), means being provided between the leg and the lever or arm for swinging the arm about its articulation to the leg. Preferably this means is a fluid-powered structure, such as a piston-and-cylinder or a hydraulic or pneumatic ram arrangement.

Because of this construction, the wheel-carrying leg can be used not only as a support leg or outrigger in the sense mentioned above (with its inner element extended and its wheel swung upwardly), but also as a traveling leg when the wheel is swung downwardly and supports the end of the leg above the ground.

Since the displacement of the wheel relative to the leg can be carried out by operation of the ram or cylinder (fluid-powered means), a direct changeover from support to rolling function can be effected and, where one leg is permitted to roll while another supports the chassis via the foot or pad, the vehicle can have a combined rolling and walking movement.

Advantageously, the wheel assemblies of the present invention are provided at the ends with arms of the vehicle chassis which themselves are hinged to a central member so that the vehicle chassis can be shifted between its lowered or compact configuration and its raised (portal or gantry) configuration.

Since the wheel-carrying legs are provided with telescoping support rams, the vehicle can be supported in any desired attitude (usually horizontal) on any irregular terrain. Furthermore, the swinging movement of the lever or arm upon which the wheel is mounted can be used in whole or in part for the "stepping" or walking movement of the device.

When, of course, normal rolling travel is desired, the support ram can be retracted and the wheel lowered. In this case it is advantageous to provide at least some of the wheels of the vehicle with propulsion means, e.g. hydraulic motors, so that these wheels can be driven to effect rolling travel of the vehicle.

The articulation of the wheel to the leg enables rapid shifting of the wheel into and out of action while the positioning of the support ram directly adjacent the wheel articulation permits the transfer of support from the ram to the wheel and vice versa for rapid shifting between normal rolling travel or walking or stepping operation. The proximity of the ram to the wheel of each assembly permits support transfer between them without difficulty or problems. As a result, the vehicle has been found to be especially effective in hilly or mountainous regions, in mining, and in all aspects of steep-bank excavations.

According to a feature of this invention, the wheel leg can itself form a piston-and-cylinder arrangement with an extensible ram constituting the piston while the leg is provided as the cylinder. However, and in accordance with the embodiment of the invention which constitutes the best mode currently known to any for carrying it out in practice, the leg is preferably formed with an outer tubular member or casing which is articulated at its lower end to the wheel-carrying arm or lever while the piston-and-cylinder arrangement telescopingly received within this leg comprises a cylinder pivotally connected at its upper end to the casing within the latter while a piston of this cylinder is connected at its lower end to a second tubular member or casing telescopingly received within the first and, in turn, surrounding the cylinder arrangement. The second casing can be formed with the ground-engaging pad. In this case, the cylinder unit is separate from but connected to the telescoping members of the leg.

The support ram or portion of the leg is thus replaceable or interchangeable with other rams or support members.

The tubular members may have any appropriate cross section, for example a rectangular or square cross section, referred to hereinafter occasionally as a "profiled" cross section. The pad can, depending upon the surface which is to be engaged thereby, be toothed or formed of an appropriate material. For example, it may have a large flat surface if it is to rest on snow, a toothed surface if it is to rest on ice or rock, a soft surface if it is to rest upon a surface which is not be be marred, or any other configuration or surface as required. The pad may be fixed to the tubular member or ram which is extended from the leg and replaced therewith or can be separately connected to this member for replacement thereto. Indeed, a flotation device can be used as the pad as well when the machine is employed in marshy or bog terrain.

It has been found to be advantageous to form the upper end of the wheel-carrying leg with a fork head or bifurcation which articulates the leg to the vehicle body or an intermediate member. This bifurcation can form part of the knuckle which defines a vertical axis about which the leg assembly can be swung preferably through an angle of close to 360 degrees.

The wheel-carrying lever or arm is preferably articulated to the lower end of the leg preferably at the region of the pad when the ram is fully contracted. This arm or lever is swung in a vertical plane and may form part of a spring suspension for the wheel.

The actuator for the vertical movement of the wheel can be connected between the wheel axis and the lever articulation and may be a piston-and-cylinder arrangement which is pivotally connected to the knuckle or fork mentioned previously. This cylinder arrangement is actuatable independently of the support ram and can be a shock-absorbing device, for example a pneumatic or gas spring in addition to forming the actuator.

The cylinder arrangements can be interconnected to provide for automatic height compensation for all of the vehicle wheels or can be constituted as so-called self-leveling suspension members.

At least the leg and the wheel lie in a common vertical plane according to the invention with the wheel being disposed along an inner side of the leg. It is also possible, moreover, to have the articulation of the arm or lever lie in this vertical plane as well and it is sometimes advantageous to provide the cylinder arrangement for swinging the wheel in this plane.

Under these conditions, the best force transmission relationships to and through the leg are established and torques and torsional movements are reduced to a minimum.

Advantageously, the steering axis of the wheel leg lies substantially at the center of the leg and is only to a slight degree offset from the width of the wheel. This has been found to improve steering with both greater and lesser road clearances. Wobbling of the wheel is thus precluded even under high speeds.

The extension of the ram and the lowering of the wheel is always possible without changing the inclination of the leg and the wheel can be self-driven, e.g. provided with a hydrostatic motor on its arm or lever. In addition or alternatively, it can be provided with a brake.

The system of the invention is especially advantageous because it can be used effectively for rolling and stepping travel of a machine or a vehicle which requires shifting between a raised or portal or gantry configuration and a compact lowered configuration while enabling the vehicle to accommodate a wide range of gradients and configurations. There is always an optimum adjustment to the terrain over which the vehicle travels or upon which it is disposed and the wheel assembly is relatively simple and reliable.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
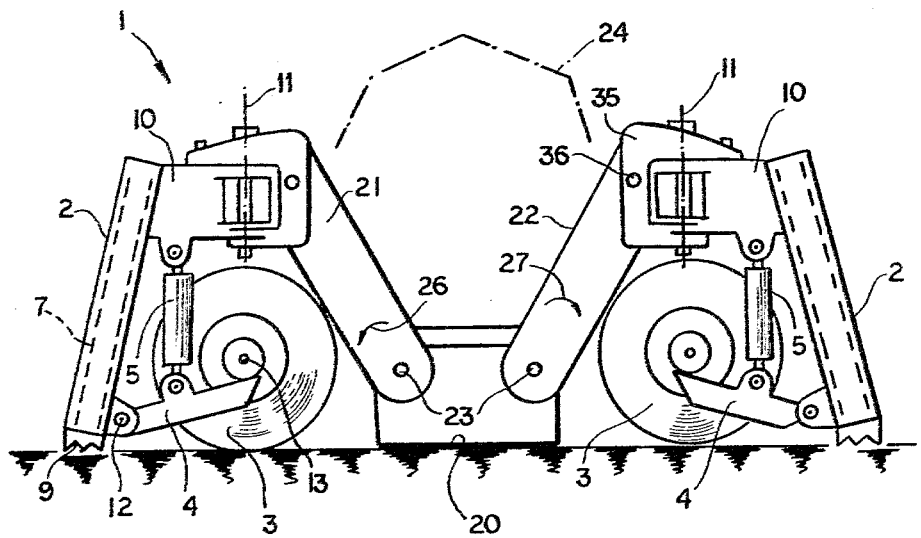
FIG. 1 is a diagrammatic side elevational view of a portion of a vehicle system embodying the invention with the vehicle body being shown in its compact or lowered state.
Figure 2:
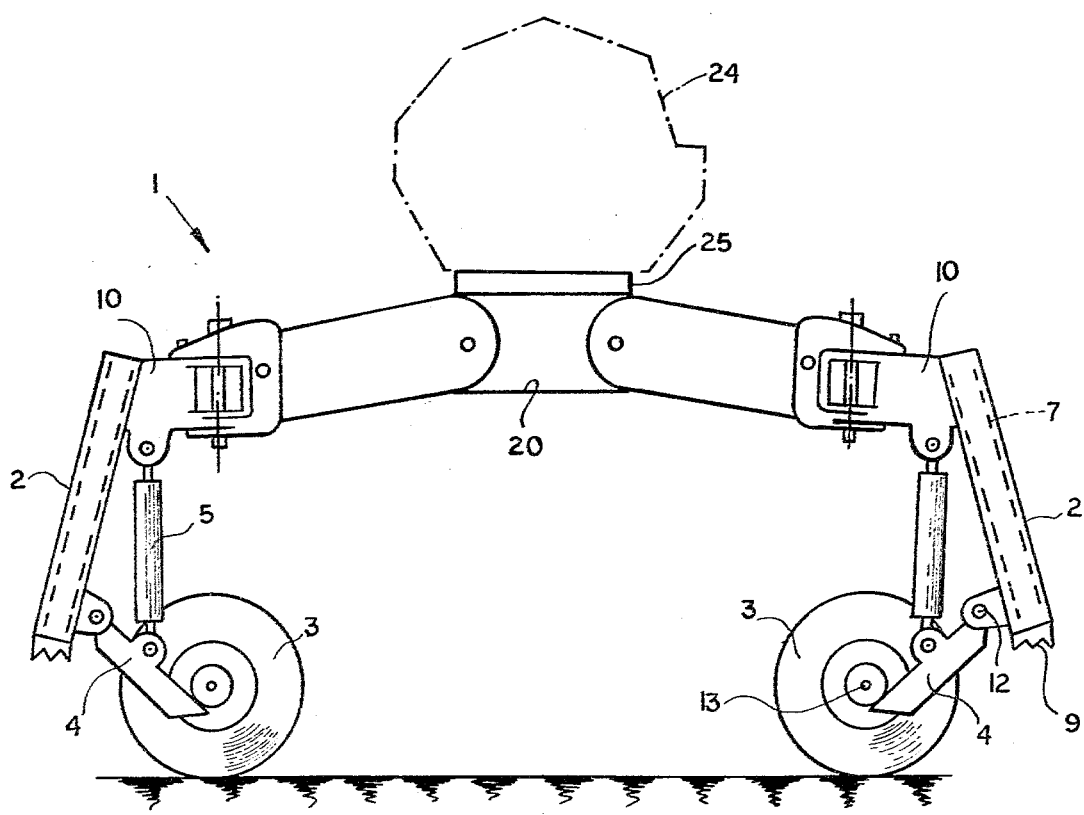
FIG. 2 is a view of the system of FIG. 1 in its portal or gantry state.

FIGS. 1 and 2 show diagrammatically a rolling and walking (striding) vehicle which can be of spider configuration and which is represented at 1. Details of the vehicle configuration and its use in various terrains, as well as the striding movement of which it is capable, will be evident from the discussion in application Ser. No. 014,593.

For the present purposes it is merely sufficient to note that the crane or excavator assembly is represented at 24, can be mounted upon a turntable 25 and can include a prime mover, as an internal combustion engine, adapted to provide motive power and a hydraulic fluid pressure arrangement required for operation of the excavator or crane.

The vehicle system includes a central support or chassis member 20 from which four arms extend as shown at 21 and 22 for two of these arms. The arms are pivoted at 23 to the central member 20 and can be swung from an upper position as illustrated in FIG. 1, respectively counterclockwise and clockwise (arrows 26 and 27) by appropriate mechanisms conventional in the art and not further illustrated here. Thus the arms may raise the vehicle from the compact or lower positions illustrated in FIG. 1 to the raised or gantry position of FIG. 2. Naturally, the FIG. 1 position can be used for better transfer of the load to the ground while travel can be effected in the gantry position of FIG. 2 with satisfactory ground clearance.

Each of the chassis arms 21 and 22 is provided with a wheel assembly which includes a wheel leg 2 and a respective wheel 3.

Each wheel leg 2 is formed with a telescoping support ram as will be described in greater detail below.

At the lower end of each wheel leg 2, there is articulated at a pivot 12 a lever or arm 4 at the free end of which a respective wheel 3 is journaled.

Trunnions 28 are provided on the lever or arm 4 substantially midway between the axis of pivot 12 and the axis 13 of the wheel 14 to form a pivot 29 whose axis lies in a common plane $P_1$ with the axes of the pivot 12 and the wheel 3.

Figure 3:
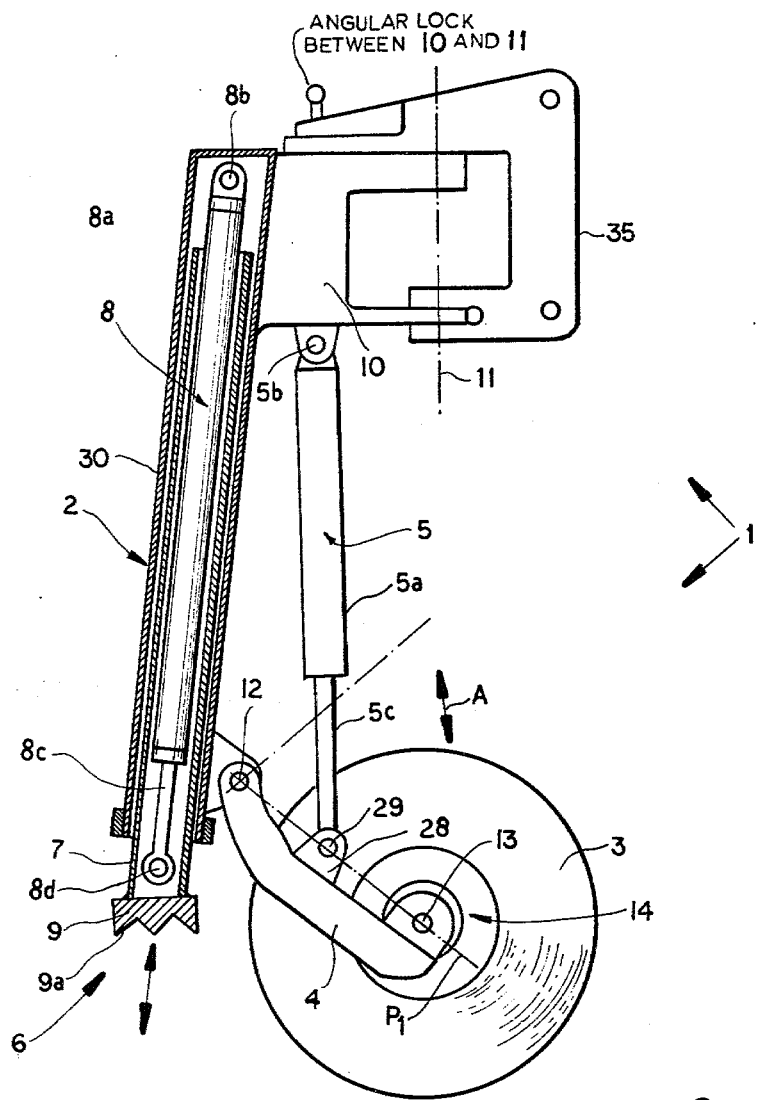
FIG. 3 is a diagrammatic cross sectional view illustrating a preferred embodiment of the invention in greater detail with the ram retracted and the wheel swung into a traveling position.
Figure 5:
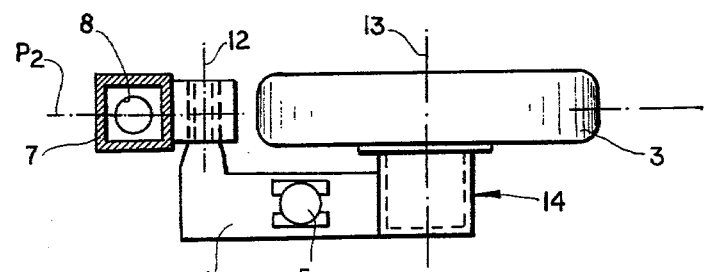
FIG. 5 is a diagrammatic plan view of a portion of the device of FIG. 3 without the detail of the knuckle.

Swinging movement is imparted to the lever 4 and hence to the wheel 3 as represented by the arrow A in FIG. 3, in a vertical plane perpendicular to the plane $P_1$ by a cylinder arrangement 5 whose cylinder 5a is pivotally connected at 5b to a bifurcated head or fork 10 rigidly connected to the outer tube 30 of the leg 2 and forming part thereof. The piston 5c of the cylinder arrangement 5 is connected to the trunnions 28 at the pivot 29.

As can be seen from FIG. 1, the tube 30 can receive another profiled tube 7 which is telescopingly fitted into the tube 30 and forms a support ram provided with the foot 9, also identified herein as a pad. The ram 7 can be hydraulically shifted out of the tube 30 by pressurization of the tube 30 in the embodiment of FIG. 1 or by a separate hydraulic cylinder arrangement represented at 8 in FIG. 3.

In this embodiment, the cylinder 8a of the arrangement 8 is connected at 8b to the square-section tube 30 and receives a piston 8c which is connected at 8d to the lower end of the square-section tube 7 within which the cylinder arrangement is received. The pivot 8d may be formed by a pin which extends transversely to the axis of the leg 2 and which can be removed to allow replacement of the ram 7 and its pad 9 which is formed with teeth 9a to grip the ground. The ram assembly, as a whole, is represented at 6.

The leg 2 is connected by its fork 10, which extends at an angle to the axis of the leg, to a knuckle 35 which, in turn, can be pivotally connected to the respective arm 21, 22 as shown at 36 in FIG. 2, or to any other portion of the vehicle chassis directly or via an intervening leg member. In any case, the fork 10 should be so mounted as to be swingable about a substantially vertical steering axis 11 which can substantially be coplanar with the wheel, i.e. can lie in the plane $P_2$ in which the center of the wheel is swingable.

In at least one position of the wheel 3 in which it engages the ground, the axis 13 of the wheel lies in a common vertical plane with the axis 11.

The lever 4 is articulated to the foot region or lower end of the leg 2 and thus is swingable in a vertical plane to adjust the height of the wheel 3 and provide a form of spring suspension for the vehicle on this wheel.

The hydraulic cylinder arrangement 5 can be replaced in whole or in part by an adjustable pneumatic suspension including a gas-cushion shock absorber. The cylinder 5 of all the wheels preferably communicate with one another to ensure that all of the wheels 3 will be positioned at the same level, at least for rolling travel of the vehicle.

It is advantageous to provide the leg 2, at least the pivot axis 12 of the lever 4 (preferably the lever itself) and the wheel 3 (preferably also the cylinder arrangement 5) in a common vertical plane, e.g. the plane $P_2$.

As noted, the steering axis 11 can coincide with the center of the wheel in at least one position and preferably in at least two positions, with the axis 11 being only slightly offset from the center of the wheel in all other positions thereof.

The wheel 3 of each leg 2 is driven by its hydrostatic motor 14 and can be provided with a respective braking device which, of course, can be constituted by the hydrostatic motor as desired.

Figure 4:
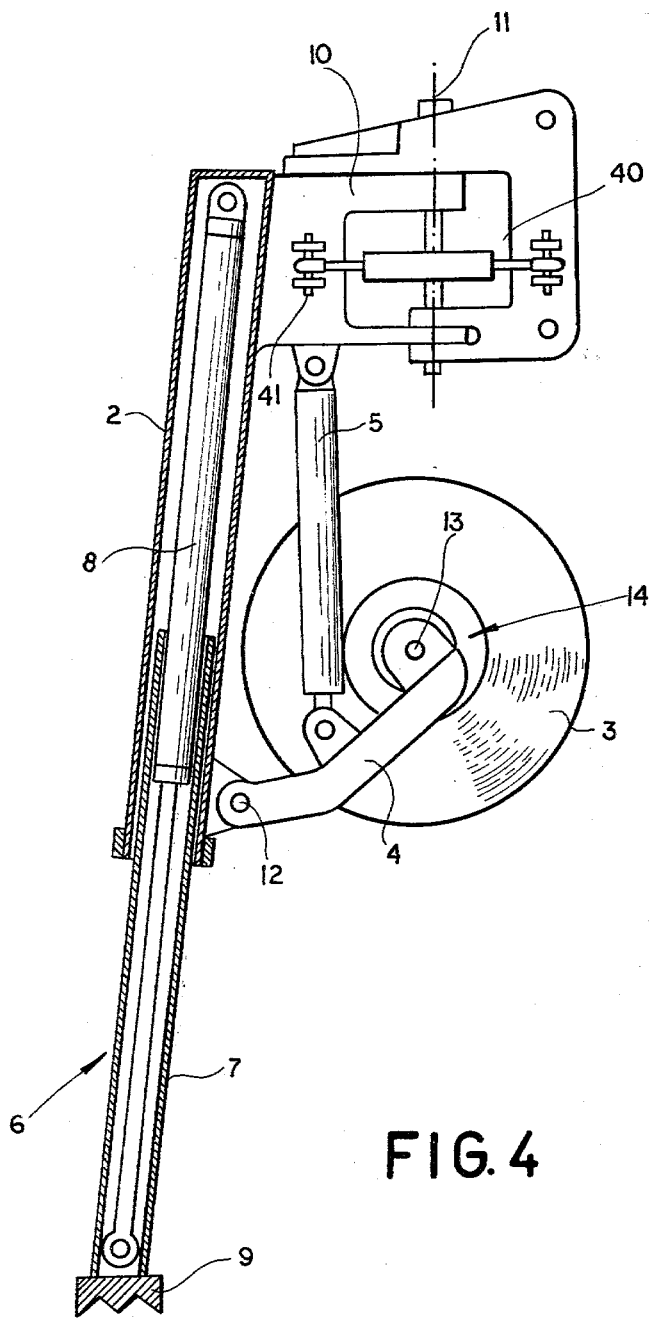
FIG. 4 is a view similar to FIG. 3 showing the wheel swung fully upwardly and the ram fully extended.

Steering movement about the axis 11 can be effected by a cylinder 40 which can be articulated to the fork 10 at 41 and to the respective knuckle as shown in FIG. 4.

As can be seen from a comparison of FIGS. 1 and 2, in the compact position of the vehicle, the pads 9 can rest upon the ground with the wheels 3 swung inwardly and upwardly. It is also possible to raise the vehicle by extending the ram 6 (FIG. 4) or to swing the wheels 3 downwardly (FIG. 2) and thereby raise the vehicle which should be brought into its gantry configuration for rolling travel. Striding operations are carried out by planting the feet on one side of the vehicle, rolling the opposite side of the vehicle away, planting the feet of these assemblies, and rolling the wheels at the first mentioned side toward the newly planted feet (see the above mentioned, applications).

I claim:

1. A wheel assembly, especially for a rolling and stepping machine, comprising:
   a wheel leg;
   a support ram telescopingly received in said leg and extensible therefrom to support said machine upon the ground;
   means for extending said ram from said leg;
   a lever articulated at one end to a lower portion of said leg;
   a wheel journaled on an opposite end of said lever; and
   actuating means connected to said lever for swinging said wheel between a position wherein said wheel is drawn away from the ground and a position wherein said wheel supports said leg on the ground.

2. The assembly defined in claim 1, wherein said leg is formed as a cylinder and said ram is displaceable from said leg upon the application of fluid pressure to said cylinder.

3. The assembly defined in claim 1 wherein said leg and said ram are tubular and receive a fluid-powered cylinder unit energizable to extend said ram from said leg and constituting said means for extending said ram.

4. The assembly defined in claim 1, further comprising means for removably and replaceably receiving said ram in said leg.

5. The assembly defined in claim 1 wherein said ram is formed as a tubular member having a support pad at its lower end.

6. The assembly defined in claim 1 wherein said leg is formed with a fork extending at an angle from the upper end of the leg and connected pivotally to said machine to enable swinging movement of said leg about a vertical steering axis.

7. The assembly defined in claim 6 wherein said lever is articulated to the lower end of said leg for swinging movement of said wheel in a vertical plane said axis lying in said vertical plane.

8. The assembly defined in claim 7 wherein said actuating means is a cylinder arrangement pivotally connected to said lever at an intermediate location therealong and to said fork.

9. The assembly defined in claim 8 wherein said leg is tubular and of substantially rectangular cross section, said ram is tubular and of substantially rectangular cross section, and said ram is provided at its lower end with a toothed support foot, said assembly further comprising a cylinder unit received in said leg for extending and retracting said ram.

10. The assembly defined in claim 9 wherein said unit includes a cylinder connected at its upper end to said leg and a piston received in said cylinder and connected at its lower end to said ram adjacent said foot.

* * * * *